United States Patent [19]
Smith et al.

[11] Patent Number: 5,790,733
[45] Date of Patent: Aug. 4, 1998

[54] OPTOELECTRONIC DEVICE RECEPTACLE AND METHOD OF MAKING SAME

[75] Inventors: Terry L. Smith, Roseville; Gordon D. Henson, Lake Elmo, both of Minn.

[73] Assignee: Minnesota Mining and Manufactouring Company, St. Paul, Minn.

[21] Appl. No.: 660,358

[22] Filed: Jun. 7, 1996

[51] Int. Cl.$^6$ .................................................. G02B 6/38
[52] U.S. Cl. ........................ 385/88; 358/89; 358/65; 358/59
[58] Field of Search ...................... 385/65, 83, 88–94, 385/59

[56] References Cited

U.S. PATENT DOCUMENTS

| | | | |
|---|---|---|---|
| 3,864,018 | 2/1975 | Miller | 385/98 |
| 3,871,935 | 3/1975 | Gloge et al. | 385/98 |
| 3,920,432 | 11/1975 | Smith | 385/114 |
| 4,023,887 | 5/1977 | Speers | 350/96 C |
| 4,289,558 | 9/1981 | Eichenbaum et al. | 156/179 |
| 4,488,773 | 12/1984 | Wagner | 385/89 |
| 4,715,677 | 12/1987 | Salto et al. | 385/109 |
| 4,730,198 | 3/1988 | Brown et al. | 385/89 |
| 4,784,457 | 11/1988 | Finzel | 350/96.21 |
| 4,793,683 | 12/1988 | Cannon, Jr. et al. | 385/75 |
| 4,980,007 | 12/1990 | Ferguson | 385/114 |
| 5,168,537 | 12/1992 | Rajasekharan et al. | 385/89 |
| 5,208,889 | 5/1993 | Cedrone et al. | 385/114 |
| 5,249,245 | 9/1993 | Lebby et al. | 385/89 |
| 5,259,050 | 11/1993 | Yamakawa et al. | 385/59 |
| 5,276,755 | 1/1994 | Longhurst | 385/88 |
| 5,287,426 | 2/1994 | Shahid | 385/85 |
| 5,309,537 | 5/1994 | Chun et al. | 385/59 |
| 5,315,678 | 5/1994 | Maekawa et al. | 385/59 |
| 5,420,952 | 5/1995 | Katsura et al. | 385/80 |
| 5,430,819 | 7/1995 | Sizer, II et al. | 385/59 |
| 5,436,997 | 7/1995 | Makiuchi et al. | 385/89 |
| 5,500,914 | 3/1996 | Foley et al. | 385/77 |
| 5,539,848 | 7/1996 | Galloway | 385/89 |
| 5,555,333 | 9/1996 | Kato | 385/89 |
| 5,625,734 | 4/1997 | Thomas et al. | 385/88 |

FOREIGN PATENT DOCUMENTS

| | | | |
|---|---|---|---|
| 0 564 207 A2 | 6/1993 | European Pat. Off. | G02B 6/38 |
| 0 613 031 A1 | 8/1994 | European Pat. Off. | |
| Hei 5-165434 | 1/1995 | Japan | |

OTHER PUBLICATIONS

Alcoa Fujikura Ltd. Technical Brochure, Feb. 1995.
AT&T Multifiber Optical Cable Assemblies Product Catalog, Sep. 1993.
MACII™ Connector Family Technical Overview, pp. 83–88.

*Primary Examiner*—John Ngo
*Attorney, Agent, or Firm*—Néstor F. Ho; H. Sanders Gwin, Jr.

[57] ABSTRACT

The present invention discloses an optoelectronic device receptacle for connecting at least one fiber cables to optical semiconductor components and a method for manufacturing the same. The optoelectronic device receptacle comprises a receptacle alignment block subassembly and a coupling body. The receptacle alignment block subassembly comprises a first alignment block portion having at least one groove formed therein. A second alignment block portion is provided for mating with the first alignment block portion. An optical fiber is disposed in the first alignment block portion. Each optical fiber is for transmitting light through the optoelectronic interface device. Finally, an adhesive is provided to secure the first and second device portions together. The receptacle alignment block subassembly further comprises an optoelectronic device array optically aligned to the alignment block, and a method of providing electrical contact to the optoelectronic devices.

26 Claims, 10 Drawing Sheets

OPTOELECTRONIC DEVICE RECEPTACLE AND METHOD OF MAKING SAME

RELATED APPLICATIONS

The present invention is related to co-pending U.S. patent application Ser. No. 08/456,571, filed Jun. 1, 1995, now U.S. Pat. No. 5,574,817 entitled FIBER OPTIC RIBBON CABLE ASSEMBLY AND METHOD OF MANUFACTURING SAME; co-pending U.S. patent application filed on Mar. 12, 1996, entitled ALIGNMENT ASSEMBLY FOR MULTIFIBER OR SINGLE FIBER OPTICAL CABLE CONNECTOR; and co-pending U.S. patent application Ser. No. 08/544,611 filed on Oct. 18, 1995, now U.S. Pat. No. 5,611,017 entitled FIBER OPTIC RIBBON CABLE WITH PRE-INSTALLED LOCATIONS FOR SUBSEQUENT CONNECTORIZATION, the disclosures of which are herein incorporated by reference in this application.

FIELD OF THE INVENTION

The present invention relates generally to connectors for optical fibers, and optical fiber ribbons, and to packaging and connectorization of optoelectronic devices used with the optical fibers and fiber ribbons. In particular, the present invention relates to a connectorized receptacle for optoelectronic devices which has optical fiber stubs integrated with the receptacle for transmitting light signals between the optoelectronic device and a connectorized fiber optic cable.

BACKGROUND OF THE INVENTION

Optical fiber ribbon cables are well known for the transmission of optical signals, such as is described in U.S. Pat. Nos. 3,920,432, 4,289,558 and 4,980,007. As the demands on communication media continue to increase, the advantages of using optical cables for transmission of signals and for interconnecting local devices, continue to grow. With this growth comes the need to connect ribbon cables to a multiplicity of devices.

Optoelectronic device receptacles are necessary components when such ribbon cables are to be connected to equipment, circuit boards and the like. These receptacles provide the interface between the fiber optic cable and the semiconductor optoelectronic devices that generate or detect optical signals. They provide the location for conversion between optical and electrical signals. The receptacle serves as a housing or package for the optoelectronic device, protecting it from the environment. If the receptacle is connectorized, it provides a releasable mechanical mating mechanism that accepts the connector on the optical fiber cable. The receptacle provides optical coupling between the optoelectronic device and the fiber cable, and typically provides means for making electrical contact to the device and thermal contact for cooling the device.

Connecting optoelectronic components such as photodiodes, LED's or lasers to the ends of fiber optic cables has in the past been a difficult and expensive task. This is due to the fact the light emitting and detecting areas on the optoelectronic devices, and the optical cores of the optical fibers, are very small in size. Therefore, precision alignment between devices and fibers is required. An alignment tolerance of about 10 μm is required for good optical coupling in a system based on 62.5 μm core multimode fiber, and an alignment tolerance of about 1 μm is required for 8 μm core single mode fiber. Maintaining precision alignment is an issue not only in the initial placement of the optoelectronic component in the receptacle, but also in the design of the receptacle to maintain alignment throughout the operating temperature range and in the presence of mechanical forces resulting from vibration, connection or pulling of the cable.

Optical coupling between an optoelectronic device and an optical fiber in the connectorized cable can be obtained in a variety of ways. In principle, a cleaved or lensed fiber end, held in the cable connector, could be positioned in close proximity and alignment to the optically active area of the semiconductor optoelectronic device. This approach is not practical, however, since then the optoelectronic device would not be protected from the surrounding environment when the connector was not inserted in the receptacle. An unprotected optoelectronic device is unacceptable with the devices currently in use because they are degraded by the contact with open air, and can be easily damaged by mechanical contact. Therefore, in today's receptacles, devices are typically enclosed in a hermetically-sealed windowed package (e.g. a standard TO can which is known to those skilled in the art) before being mounted in the receptacle, and optical coupling occurs through a flat or lensed window mounted in the package wall. Obtaining efficient optical coupling between the hermetically-packaged device and the fiber may require additional lenses outside the hermetic package. Of course, all of the components in the optical path must be precisely aligned in order to achieve maximum coupling.

The above approach, while useable, has several disadvantages. First of all, it does not make good use of the precision that is built into optoelectronic devices. As a result of the photolithographic and etching processes that are used to fabricate such devices, submicron physical features are possible. Although these features could in principle be used to aid in alignment to fibers, this is not possible in the typical packaging approach discussed above. This is due to the fact that when these devices are mounted in standard hermetically sealed packages, they are not precisely placed in the packages; therefore the package body cannot be used as a reference surface to position the package precisely in the receptacle. Having thus lost the precision originally built into the device, the active area of the device must be optically aligned to the fiber actively. That is, the device must be energized and robotically moved into the position of maximum optical coupling. This type of active alignment process is slow and expensive.

Another disadvantage of the traditional approach is that it is not well-suited to fiber ribbon systems. A key reason for this is that the spacing between optical fibers in a ribbon cable is small, typically 250 microns. Therefore, due to size constraints, individual TO-style packages cannot be used. Packaging an array of devices in a single windowed package is also impractical. This is due to the difficulty associated with producing either a single optical element, or an array of micro-optical lenses, which can couple an array of fibers (at 250 micron pitch) to an array of devices, while maintaining high efficiency and low channel-to-channel optical crosstalk.

Several solutions have been proposed for optically coupling an array of optoelectronic devices to an optical fiber ribbon. The existing techniques generally fall into two categories. The first technique involves passive alignment of an alignment block to a substrate surface and therefore is generally easier to manufacture, but is more imprecise and therefore not adequate for achieving reproducible high-efficiency optical coupling between devices and optical fiber, especially in the case of single-mode fiber. The second technique generally involves active alignment of an optoelectronic component to a surface on an alignment block and therefore is more difficult and expensive to manufacture, but is more precise and effective in achieving reproducible, low-loss optical coupling.

Examples of the first technique are shown in PCT Appln. No. PCT/US94/05749 to Swirhun et al. and in Bona et al., Parallel Optical Links With 50 μm Ribbon Fibers: Laser Array Concepts and Fiber Skew Analysis, Proceedings of the 20th European Conference on Optical Communication, 1994, Vol. 2, pp. 829–832. In each of these systems, the optoelectronic component (generally an array of optoelectronic elements) is mounted on a substrate surface and electrically connected thereto. The substrate surface is provided with one or more mechanical alignment features (e.g., holes, slots or channels) which mate with alignment features of an alignment block carrying a plurality of fiber optic stubs. In this way, there is a passive, mechanical alignment of the fiber optic stubs in the alignment block with the optoelectronic elements of the optoelectronic component.

While this technique is well-suited for lower performance interconnections with fibers having large core sizes (e.g., 62.5 μm core standard multi-mode fiber), the inherent mechanical tolerances of the mechanical alignment features tend to limit the use of these techniques in higher performance, small-core fiber interconnections. In addition, the need to mount the optoelectronic device on a substrate surface imposes difficulties in producing an optoelectronic receptacle which can be connectorized in a plane of orientation parallel to the plane of the circuit board on which the device is to be mounted.

The Bona reference specifically discloses a parallel optical link for butt-coupling an optical component. Alignment is accomplished via alignment pins. While alignment pins are satisfactory for general alignment, they have significant disadvantages when precision alignment is required, especially for wide multifiber interfaces. In particular, the alignment of two connector alignment blocks via two pins suffers from the problem that the system is mechanically overconstrained. That is, the pins may prevent the faces of the two connector blocks from coming into intimate contact if the pins are not perfectly perpendicular to the block face. The Bona reference also discloses an optical link having optical fibers extending only a portion of the way through the optical link.

Examples of the second technique are shown in U.S. Pat. Nos. 5,359,686 to Galloway et al., 5,271,083 to Lebby et al. and 5,265,184 to Lebby et al. In these systems, the optoelectronic component is mounted directly on the alignment block, typically by use of a transparent contact adhesive or by solder bump bonding. The alignment block in each case is comprised of a plurality of molded waveguides encased in an injection-molded, plastic alignment block. In all of these patents, the plastic alignment block also includes electrical contacts on the surface to which the optoelectronic component is to be mounted for providing electrical power to the optoelectronic component. The electrical contacts are integrated into the plastic alignment block and connected to a leadframe extending therefrom.

The use of molded plastic waveguides or a molded plastic alignment block containing both the waveguides and the electrical contacts is disadvantageous for a number of reasons. First, the molded waveguides, while optically tuned to the particular optical fiber of a fiber optic ribbon, will be of an optically different material and there will necessarily be optical loss by virtue of this difference in materials. Second, the alignment block will be limited by the thermal and mechanical properties of the molded plastic (e.g. thermal expansion and thermal conductivity), which in some cases are not sufficient for higher performance applications. Finally, the integrated electrical contacts tend to create noise and interference at high operational frequencies, which also limits the application of this technique in high speed performance environments.

While existing techniques for creating receptacles for optoelectronic components in order to connectorize the optoelectronic component to an optical fiber ribbon have been effective for lower performance, large pitch interconnections, it would be desirable to provide an optoelectronic device receptacle and method of making the same which overcame the disadvantages of the existing techniques and which was more cost effective and easier to manufacture.

SUMMARY OF THE INVENTION

The present invention discloses an optoelectronic device receptacle for connecting multifiber optical ribbon cables to optoelectronic semiconductor components. The optoelectronic device receptacle consists of an alignment block retained in a receptacle body. The alignment block contains an array of short sections of optical fibers (fiber stubs), which serve as optical coupling elements. The alignment block comprises a first portion having a plurality of grooves formed therein. A second portion is provided for mating with the first portion. An optical fiber stub is disposed in each of the grooves formed in the first portion, and transmits light through the receptacle. A securing means is provided to secure the first and second device portions together to form the alignment block. An optoelectronic semiconductor component is provided for mounting. In the preferred embodiment, the alignment block contains mechanical features which perform precision alignment of the block to a connector on the end of a fiber ribbon cable.

The present invention further includes a method of fabricating an alignment block. The method includes the steps of providing a first alignment block portion having a plurality of grooves formed therein. Multiple optical fibers are then positioned adjacent the grooves formed in the first alignment block portion. A second alignment block portion is then placed over the first alignment block portion such that the multiple fibers are between the first and second alignment block portions. The first and second alignment block portions are then secured together such that individual fibers are located in each of the grooves of the first device portion. After the corresponding ends of the fiber stubs are prepared for mating with the optoelectronic devices and with the cable connector, an optoelectronic semiconductor component is mounted to the mated first and second alignment block portions.

An optoelectronic device receptacle having a flexible circuit and an optoelectronic semiconductor component mounted thereto is also disclosed in the present invention. As before, the optoelectronic device receptacle consists of an alignment block retained in a receptacle body. The alignment block contains an array of fibers stubs which serve as optical coupling elements. The alignment block comprises a first portion having a plurality of grooves formed therein. A second portion is provided for mating with the first portion. An optical fiber stub is disposed in each of the grooves formed in the first portion, and transmits light through the receptacle. A securing means is provided to secure the first and second device portions together to form the alignment block. A flexible circuit for providing electrical connection to an optical semiconductor component is provided and is mounted to the mated first and second alignment block portions. An optoelectronic semiconductor component is provided for mounting to the flexible circuit.

An optoelectronic interface system is also disclosed in the present invention. The interface system provides an optoelectronic device subassembly comprising an alignment block and an optoelectronic semiconductor component mounted thereto, and retained in a receptacle body. A fiber optic ribbon cable is provided as part of the interface system. A connector block assembly is also provided; it is retained in a connector body and is attached to the ribbon cable. In this embodiment, the connector block and the alignment block are made of the same material.

The advantages of the present invention include the fact that optical fibers are used as the optical coupling elements to transmit light within and throughout the length of the optoelectronic device receptacle, as opposed to waveguides fabricated from an epoxy or other such media as in the prior art. This gives the device receptacle the same light transmission characteristics as the connected ribbon cable. Furthermore, the process used to manufacture the optical coupling elements is very simple and very similar to the process used to fabricate connectors on the cable. Additionally, the optoelectronic device receptacles of the present invention can be manufactured in line with optical ribbon cable and cable assemblies. Finally, the optoelectronic device is aligned to the fibers in the present invention, as opposed to alignment pins as is done in some prior art references.

BRIEF DESCRIPTION OF THE DRAWINGS

FIG. 6b is an expanded cross sectioned view of the circle portion of FIG. 6a.

DETAILED DESCRIPTION OF THE PREFERRED EMBODIMENTS

The present invention is an optoelectronic device receptacle for connecting multifiber optical ribbon cables to optical semiconductor components, and a method for making the same. The device receptacle is made from an alignment block assembly to which optoelectronic semiconductor components are bonded, and a receptacle body for mating to a connector on the end of a fiber optic ribbon cable. A flexible electrical circuit for providing electrical connection to the optical semiconductor components and for mounting the semiconductor components onto the device receptacle is also provided in the present invention.

Figure 1:
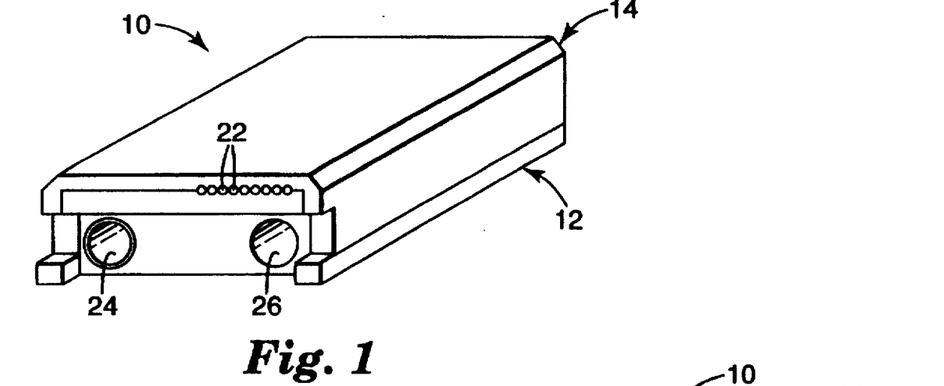
FIG. 1 is a perspective view of an alignment block assembled from first and second alignment block portions, with fiber stubs in place.
Figure 2:
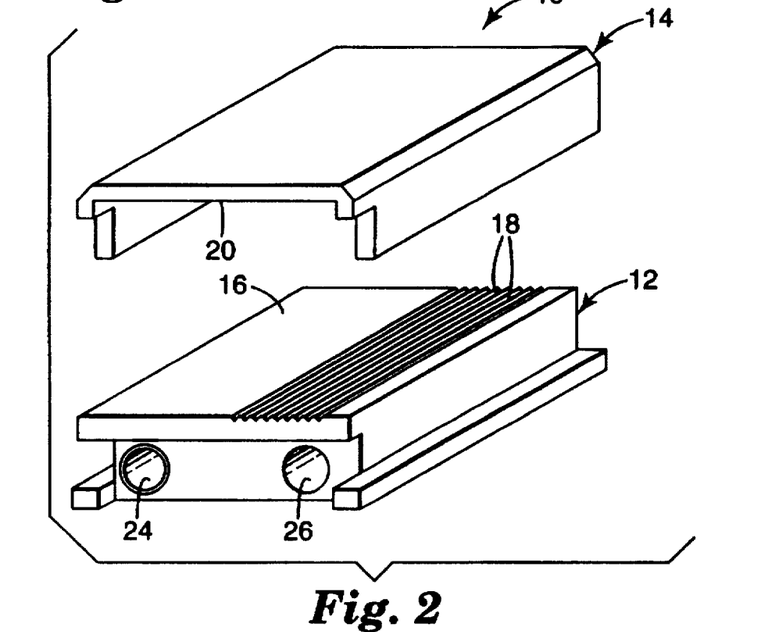
FIG. 2 is an exploded perspective view of the first and second alignment block portions according to the present invention.

An alignment block assembly 10 made according to the present invention is illustrated in FIGS. 1 and 2. Alignment block assembly 10 comprises a first assembly portion 12 and a second assembly portion 14 for mating with first assembly portion 12. Alignment block assembly 10 is preferably made of ceramic, but may also be manufactured from plastic or metal materials. Alternatively, it may be comprised of a plastic body having a ceramic or metal insert corresponding to the portion of alignment block assembly 10 which interfaces with optical fibers. First assembly portion 12 has a mating surface 16 in which a plurality of grooves 18 are formed. Second assembly portion 14 has a mating surface 20 which is flat and serves to hold fibers firmly in grooves 18.

Grooves 18 are provided to retain individual fiber stubs 22 as will be described in greater detail below. It should be noted that the grooves may be formed on only first assembly portion 12, or on only second assembly portion 14, or on both the first and second assembly portions without departing from the spirit or scope of the invention. Additionally, the grooves of the preferred embodiment are illustrated as being V-grooves, but other shapes of grooves, such as square grooves or semicircular grooves could also be used without departing from the spirit or scope of the invention. First assembly portion 12 also includes first and second receiving cavities 24, 26 respectively. First and second receiving cavities 24, 26 are for alignment purposes as will be described in greater detail below.

Figure 2A:
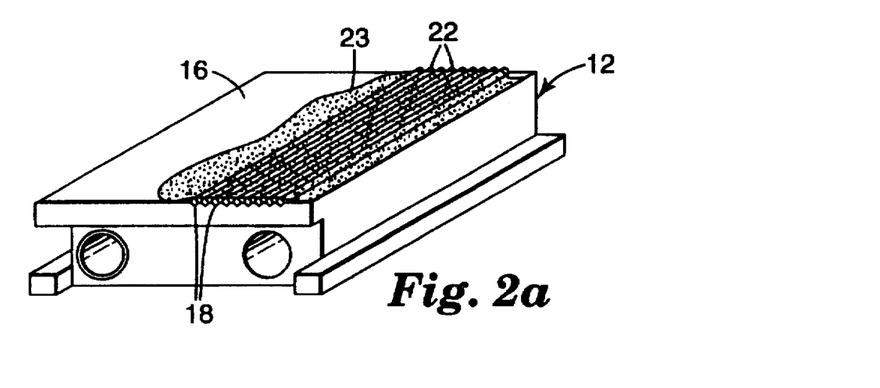
FIG. 2a is an alternative embodiment of the alignment block of FIGS. 1 and 2.

It would also be possible to make alignment block assembly 10 without second assembly block portion 14 as illustrated in FIG. 2a. Grooves 18 are provided as in the preferred embodiment to retain individual fiber stubs 22 that run the length of the assembly block. A bonding agent 23 such as potting, which in the embodiment illustrated is translucent, is provided to retain and protect fibers 22 in grooves 18.

Figure 3:
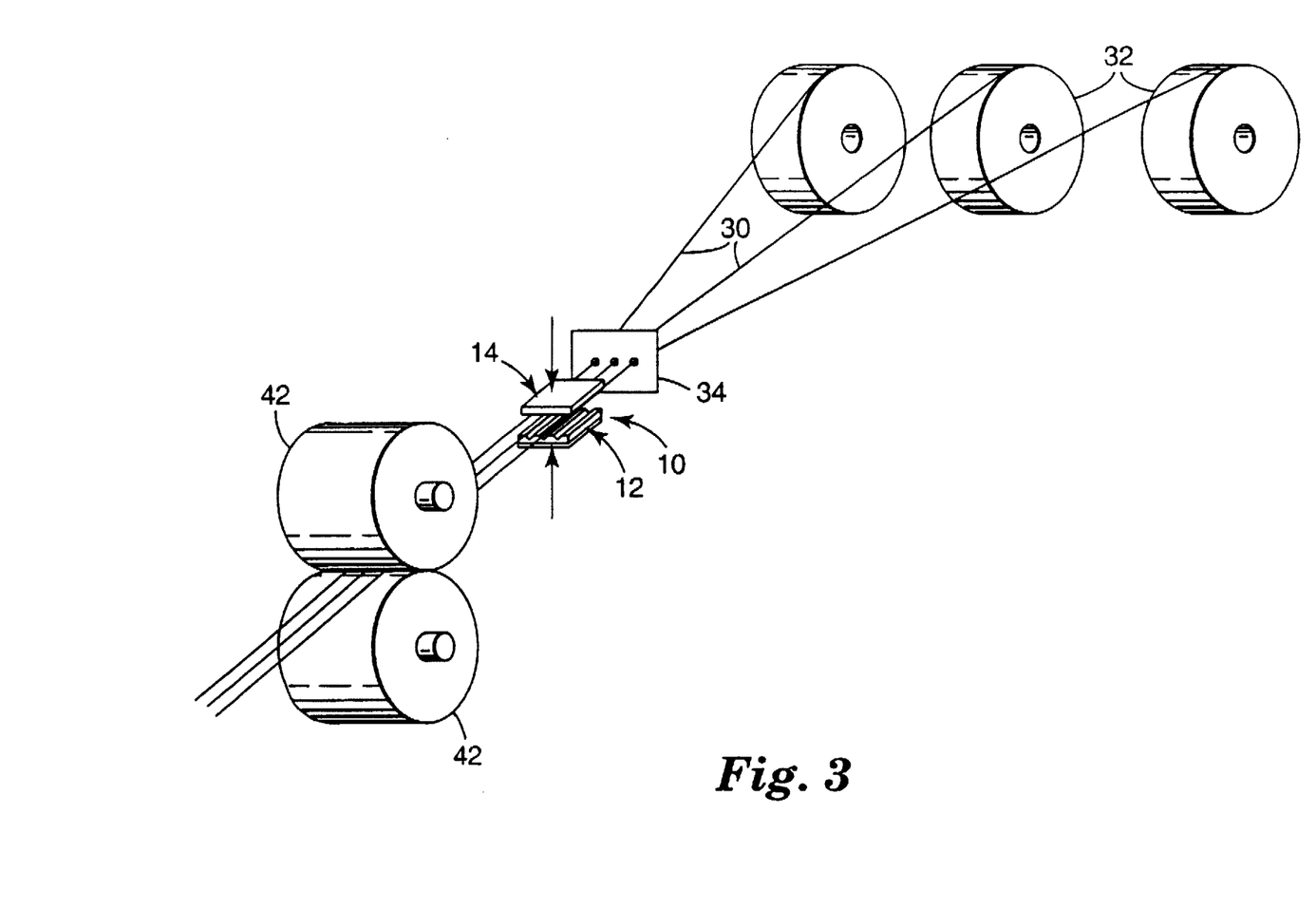
FIG. 3 is a schematic illustration of a method of assembling an alignment block of the present invention.

FIG. 3 is a schematic illustration of a method of manufacturing an alignment block assembly 10 via a continuous in-line fabrication process. While FIG. 3 illustrates a preferred embodiment for manufacturing the present invention, it should be understood that other methods of manufacturing are also possible such as manually assembling each alignment block assembly separately, without departing from the spirit or scope of the invention. At this point, specific reference should be made to assignee's co-pending U.S. patent application Ser. No. 08/456,571, filed Jun. 1, 1995, entitled "FIBER OPTIC RIBBON CABLE ASSEMBLY AND METHOD OF MANUFACTURING SAME", the disclosure of which was previously incorporated by reference in this application.

At least one optical fiber 30 is drawn from a corresponding at least one spool 32 holding such optical fibers. FIG. 3 is illustrated with 3 fibers and spools, but any number of fibers may be used. A guiding comb 34, or a functionally equivalent grooved roller or the like, is provided with structure to establish a fixed, lateral interfiber spacing between optical fibers 30. Preferably, the spacing corresponds with a fixed lateral interfiber spacing of grooves 18. After optical fibers 30 are brought through guiding comb 34, first and second alignment block assembly portions 12, 14 are positioned above and below optical fibers 30. An adhesive is then introduced on one of the mating surfaces 16 or 20 of one of the first or second assembly portions to secure the portions together. The adhesive used in the present invention is a commonly used adhesive for optical connectors, but other mechanisms for joining first and second assembly portion 12, 14 may be used, such as a mechanical latching mechanism or welding, including ultrasonic welding. First and second assembly portions 12, 14 are then brought together under pressure from compression rollers 42 so as to sandwich optical fibers 30 therebetween, thereby fixing the lateral interfiber dimension within alignment block assembly 10. At a point further downstream in the process, the completed alignment block assemblies 10 are cut from the array of fibers 30, and the ends of the fiber stubs are optically finished flush with the alignment block surface.

Figure 4:
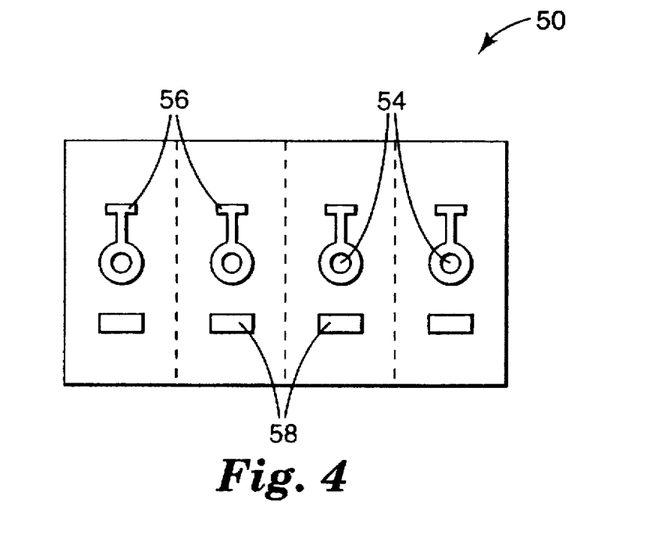
FIG. 4 is a front plan view of a known semiconductor light emitting device.

FIG. 4 is a front plan view of a known semiconductor light emitting component 50. The present invention is designed to interface with a number of different light emitting components such as LEDs, laser arrays, edge-emitting lasers, superluminescent diodes, vertical cavity surface emitting lasers (VCSELs), and other surface emitting devices. Additionally, the present invention may interface with a number of different optoelectronic detectors. In the preferred embodiment, component 50 is a VCSEL. As illustrated in FIG. 4, VCSEL 50 is comprised of a number of individual lasers joined to form an array. The array has a plurality of active regions 54 from which light is projected, and electrical contact pads 56, 58 for providing power to the device.

Figure 5:
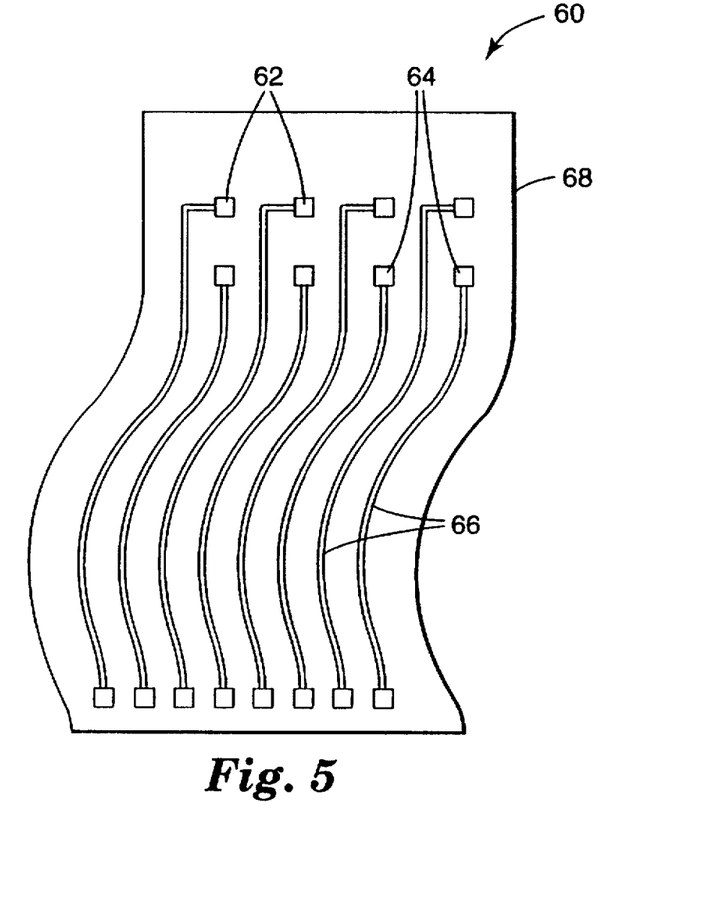
FIG. 5 is a side elevational view of a flexible electronic circuit according to the present invention.

FIG. 5 illustrates a flexible circuit 60 for connection between VCSEL 50 and alignment block 10. Flexible circuit 60 consists of metal traces 66 patterned on a thin flexible polymeric substrate 68. Flexible circuit 60 also contains contact pads 62, 64. Electrical contact to the contact pads 56, 58 on the VCSEL 50 is made by aligning the contact pads on the VCSEL to contact pads 62, 64 on the flexible circuit, and bonding the pads together by compression bonding or solder reflow. Electrical contact between the VCSEL and external electronics can then be made via conducting traces 66 on flexible circuit 60. In the preferred embodiment of the present invention, flexible circuit 60 is thin and transparent such that VCSEL 50 may launch light through it when connected between the VCSEL 50 and alignment block 10 as will be described below.

Figure 6A:
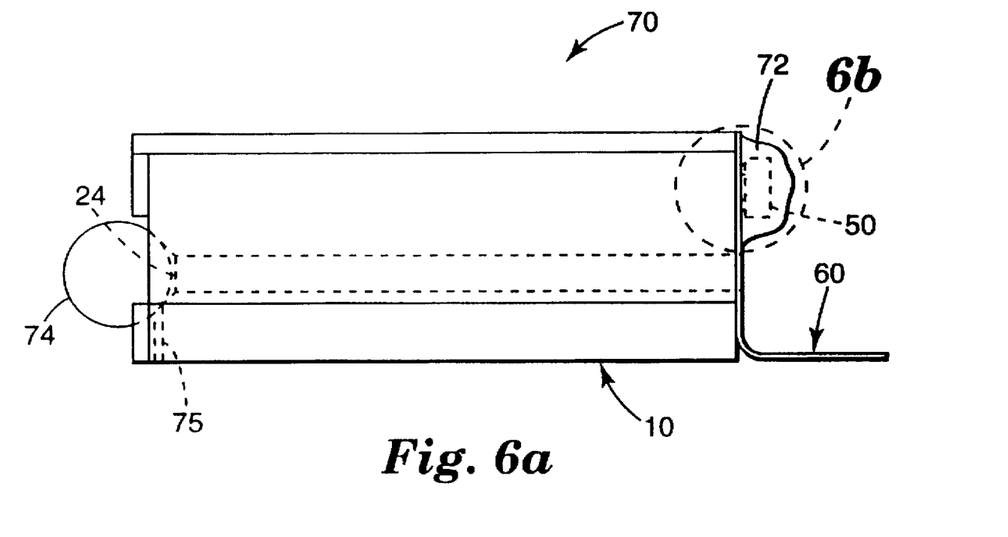
FIG. 6a is a schematic illustration of an alignment block having a semiconductor optoelectronic device aligned to the fiber stubs in the alignment block and a flexible electronic circuit to make electrical contact to the semiconductor device.
Figure 6B:
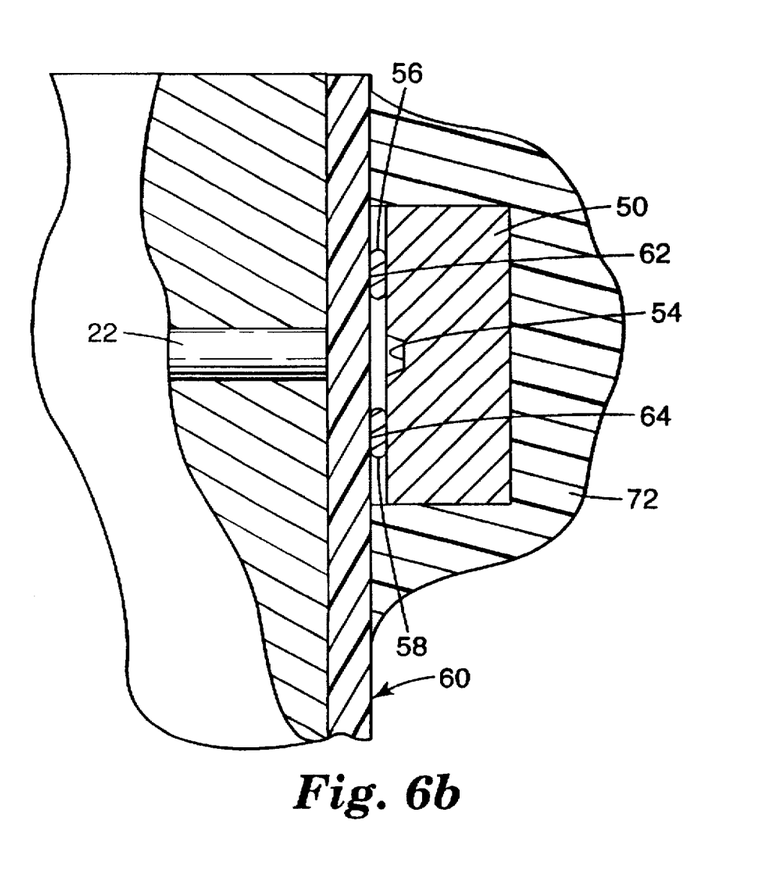

A receptacle subassembly 70 is shown schematically in FIGS. 6a and 6b. Subassembly 70 comprises alignment block 10 having flexible circuit 60 and VCSEL 50 bonded in place. VCSEL 50 is mounted to and aligned such that active areas 54 are aligned with fiber stubs 22. In the preferred embodiment, VCSEL 50 is covered with an electrical resin 72 to protect it from the surrounding environment. Finally, an alignment feature, such as, for example, a ball 74, is bonded into cavity 24 as will be discussed in greater detail below.

First receiving cavity 24 is machined to form a chamfer for receiving and for having secured inside it a portion of the alignment ball 74. Second receiving cavity 26 (not shown in FIG. 6a) is sized to receive a substantial portion of alignment ball 74, as will be described in detail below. In the preferred embodiment of the present invention, a bore 75 is provided to receiving cavity 24 to allow the introduction of a bonding agent. Bore 75 may be formed to come up from the bottom of assembly 10 as shown in FIG. 6a, or it may go through the side of assembly 10. In one embodiment, first and second receiving cavities may extend through the length of assembly block portion 12. Once alignment ball 74 has been seated in the chamfer, a bonding agent is introduced through channel 75 to secure ball 74 in place. It should be noted that the bonding agent could be directly applied to the chamfer and the alignment ball then inserted as long as the bonding agent is uniformly applied so that alignment ball 74 accurately seats in the chamfer. At this point, specific reference should be made to the above referenced application entitled "ALIGNMENT ASSEMBLY FOR MULTIFIBER OR SINGLE FIBER OPTICAL CABLE CONNECTOR".

The alignment feature described above, ball 74, is provided to precisely align the alignment blocks, which in turn precisely align the individual optical fibers. The alignment feature 74 is preferably a highly precise steel ball bearing but could also be formed from other materials having the precision of a steel ball bearing such as tungsten carbide, ceramic, metal or plastic, such as liquid crystal polymer, without departing from the spirit of scope of the invention. Other bonding agents may also be used without departing from the spirit or scope of the present invention.

The chamfer of first receiving cavity 24 preferably is formed to retain less than one half of alignment ball 74. Second receiving cavity 26 is sized to slidingly engage and receive more than half of alignment ball 74. This insures that when two devices are coupled together alignment ball 74 is entirely encompassed by both devices and the devices are constrained from movement in a multitude of directions.

Figure 6C:
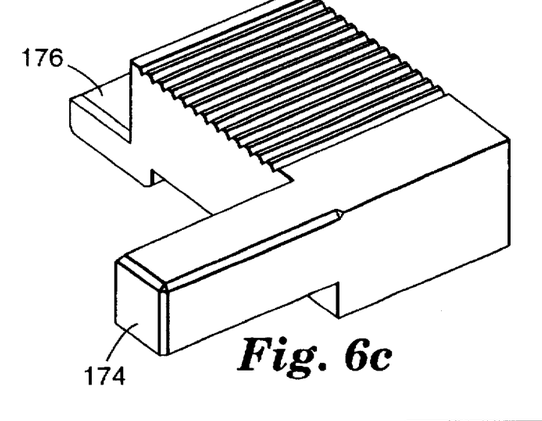
FIG. 6c is a perspective view of an embodiment of an alignment block with an alternative alignment feature.

Numerous alternative embodiments of the receiving cavities and alignment features may be made without departing from the spirit or scope of the invention. For example, as shown in FIG. 6C, the alignment feature may be a beam-like projection 174, which may engage an appropriately-shaped receiving cavity 176 in another assembly block portion. In addition, receiving cavities may be partially formed in each of the first and second assembly block portions.

Figure 7:
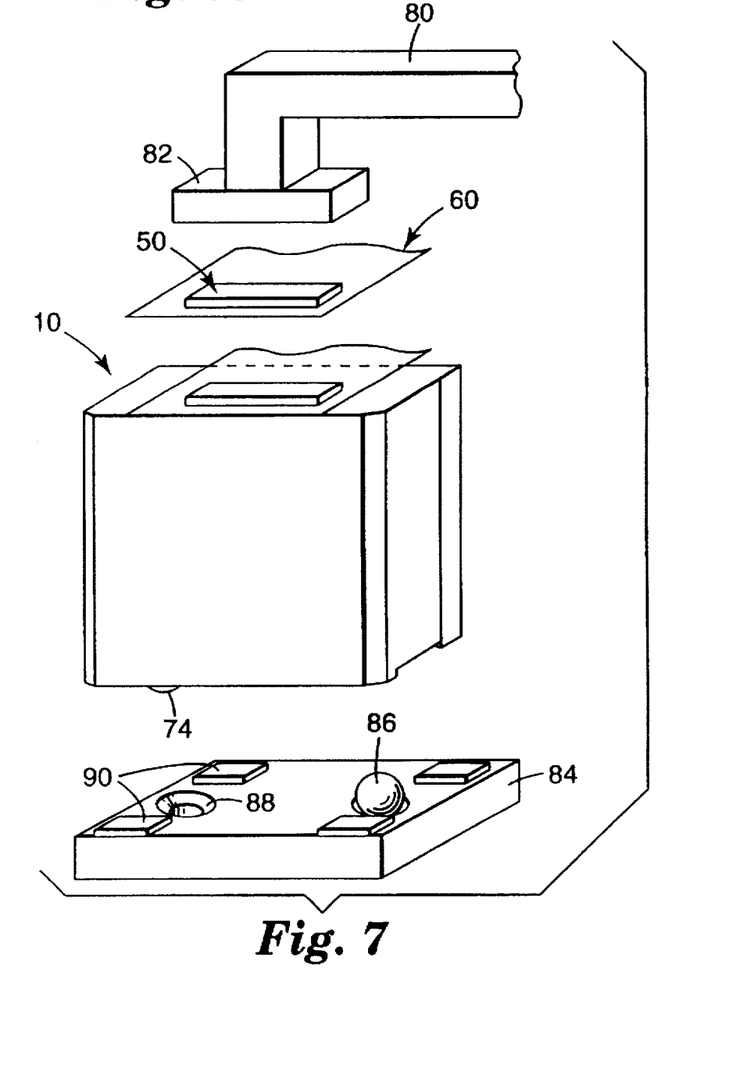
FIG. 7 is a perspective view of an alignment device for aligning the optoelectronic devices to the fiber stubs.

Optical alignment of VCSEL 50 to fiber stubs 22, and attachment of flexible circuit 60 and VCSEL 50 to alignment block 10 can be performed in a robotic assembly apparatus such as shown in FIG. 7. A robotic positioning arm 80, equipped with a vacuum chuck 82 is used to pick up an assembly consisting of VCSEL 50 bonded to flexible circuit 60. The VCSEL is precisely registered in the chuck at the time the assembly is picked up by the chuck. Registration may be performed using a vision system which aligns fiducial marks on VCSEL 50 to fiducial marks on chuck 82, or using mechanical registration between features on the chuck and features on the VCSEL or flexible circuit. Alignment block 10 is precisely positioned in the robotic assembly apparatus by mating to a reference plate 84 equipped with reference plate alignment ball 86 which fits into cavity 26 in alignment block 10, and with cylindrical hole 88 which accepts alignment block alignment ball 74. Angular alignment of the block to the plate is provided by alignment pads 90.

Figure 8:
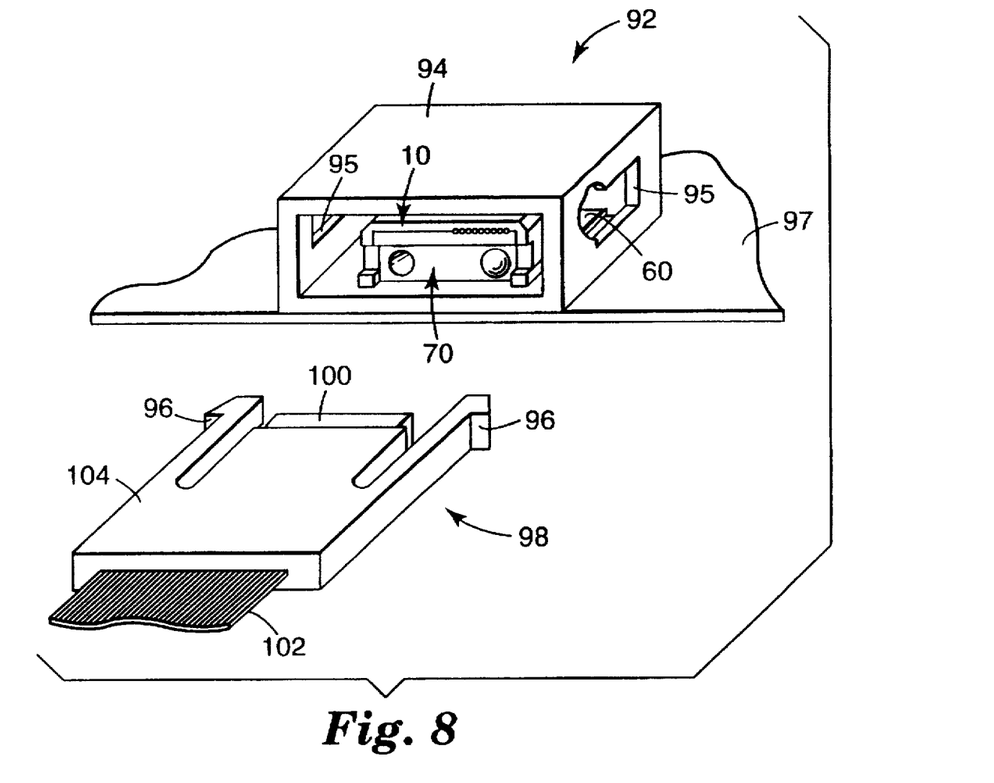
FIG. 8 is a partially exploded simplified perspective view of an optoelectronic device receptacle according to the present invention installed in an application.

The optoelectronic device receptacle 92 shown in FIG. 8 is completed by enclosing the completed receptacle subassembly in a receptacle body 94. As illustrated in FIG. 8, the completed device receptacle 92 includes receptacle body 94 surrounding subassembly 70. As previously described, subassembly 70 comprises alignment block 10 having flexible circuit 60 and VCSEL 50 bonded in place and covered with resin 72, and having receiving cavities 24, 26 and alignment ball 74. Receiving slots 95 are provided in receptacle body 94 for receiving portions of a latching mechanism 96, as will be described below. Receptacle 92 may be mounted to a circuit board 97 by any commonly known mounting means such as adhering, press fitting, molding, mechanical latching or the like. It will be seen that, unlike many existing optoelectronic receptacles, receptacle 92 can be mounted on circuit board 97 such that the plane of orientation of the optical connection is parallel to the plane of the substrate surface of circuit board 97.

FIG. 8 also illustrates a preferred connector 98 which is adapted for connection with receptacle 92. Connector 98 is comprised of a connector alignment block 100 which is attached to a fiber optic ribbon cable 102, and a connector body 104 which includes latch mechanism 96. Connector alignment block 100 has first and second receiving cavities and an alignment ball as in the receptacle alignment block, but they are not seen in FIG. 8. Latch mechanism 96 is inserted into receiving slots 95 to releasably latch connector 98 to receptacle 92. Latch mechanism 96 provides mechanical force to keep connector 98 mated with alignment block 10. While the latch mechanism provides the force to keep the parts mated, the alignment balls provide the precise alignment.

Figure 9:
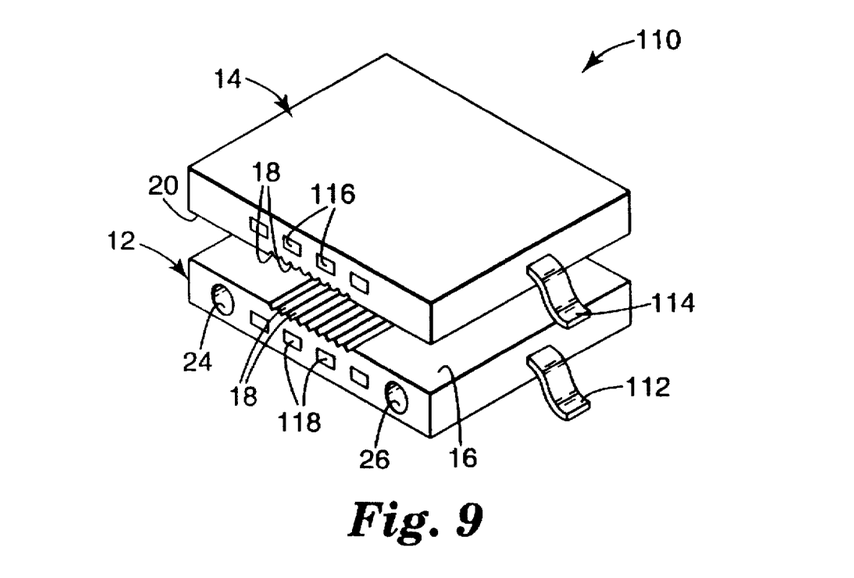
FIG. 9 illustrates an alternate embodiment of an alignment block having electrical leads contained in the block portions.

In a first alternate embodiment of the invention, shown in FIG. 9, the electrical leads for the optoelectronic device receptacle are embedded in one or both of the first and second portions of the alignment block by overmolding a metal leadframe with plastic or ceramic. Because many elements from the preferred embodiment are the same as those in the first alternative embodiment, like elements will be correspondingly identified. An alignment block assembly 110 made according to the first alternative embodiment of the present invention is illustrated in FIG. 9. Alignment block assembly 110 comprises a first assembly portion 12 and a second assembly portion 14 for mating with first assembly portion 12. Alignment block assembly 110 is preferably made of ceramic, but may also be manufactured from plastic or metal materials and may, for example, be comprised of a plastic body having a ceramic or metal insert corresponding to the portion of alignment block assembly 110 which interfaces with optical fibers. First assembly portion 12 has a mating surface 16 in which a plurality of grooves 18 are formed. Likewise, second assembly portion 14 has a mating surface 20 which has a plurality of grooves 18 formed therein which substantially mirror the grooves in mating surface 16.

First assembly portion 12 also includes first and second receiving cavities 24, 26 respectively. As previously described, first and second receiving cavities 24, 26 are for alignment purposes. Alignment block assembly 110 also includes electrical lead portions 112, 114 projecting from first and second assembly portions, respectively. Lead frame contacts 116, 118 are also provided to make electrical connection with contact pads 56, 58 of VCSEL 50. It should be noted that lead frame contacts 116, 118 may be on either the surface that couples with the light emitting component or the other side of the alignment block or both, without departing from the spirit or scope of the invention. Electrical lead portions 112, 114 are connected to lead frame contacts 116, 118 respectively and are connectable to the circuit board on which assembly 110 is mounted to provide power to lead frame contacts 116, 118, respectively.

Figure 10:
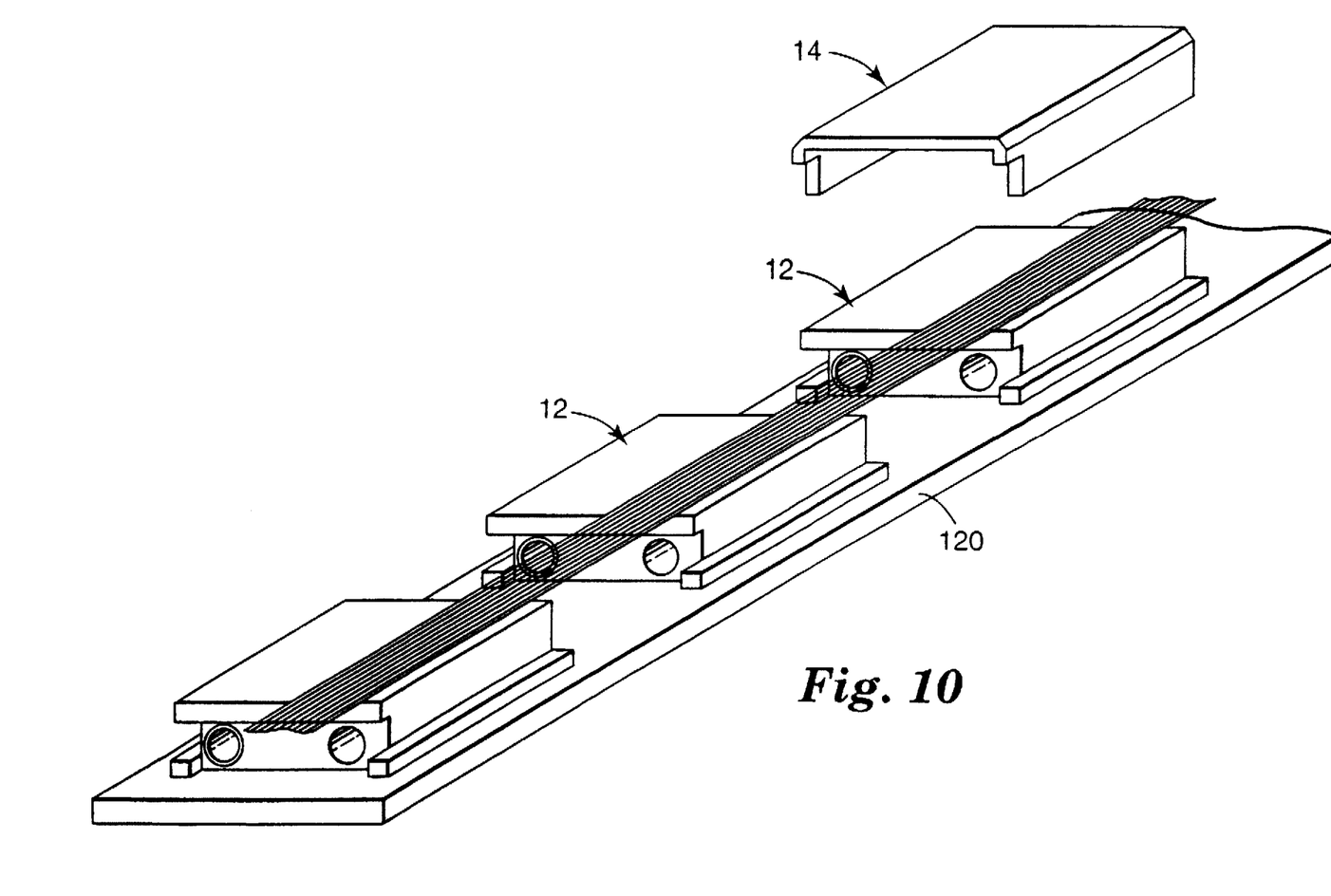
FIG. 10 illustrates a frame for holding several portions of alignment blocks for simultaneous fiber insertion.

In another embodiment of the invention, shown in FIG. 10, several first portions 12 of alignment blocks are held together in a frame 120. Similarly, several second portions 14 of alignment blocks would be held together in a frame for assembly over the fiber array. After assembly of the respective first and second portions 12, 14 of the alignment blocks, frame 120 is removed. This approach allows many fibers to be assembled into many alignment blocks at the same time, reducing the time and cost of assembling the blocks.

Figure 11:
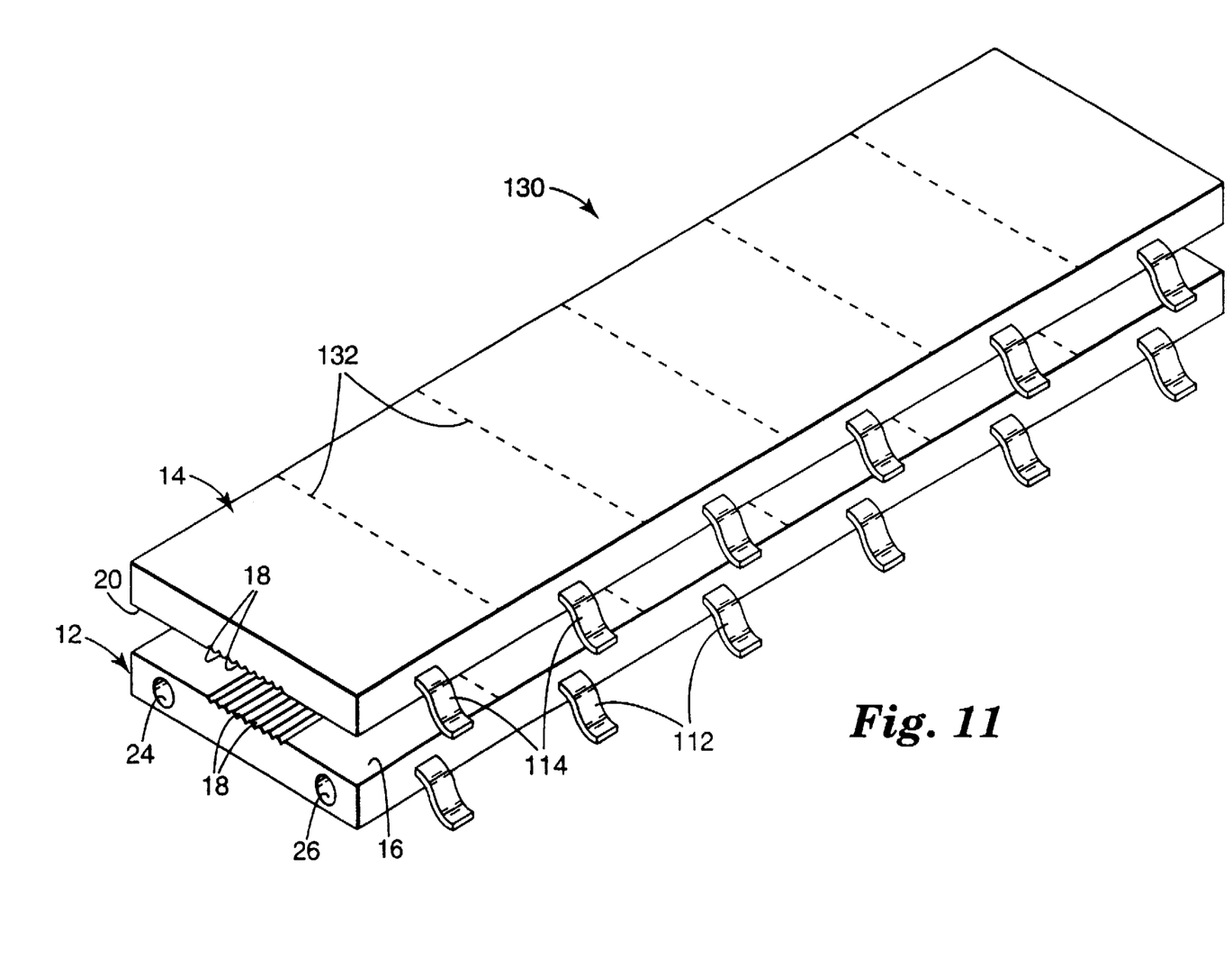
FIG. 11 illustrates another method of assembling alignment blocks, in which the fiber is placed in a long block portion preform, from which separate blocks are cut.

FIG. 11 illustrates another alternative embodiment of the present invention. Specifically, FIG. 11 illustrates an alignment block preform 130 from which a plurality of optoelectronic device receptacle alignment blocks can be made. Alignment block 130 is similar to alignment block assembly 110 and thus corresponding elements will have corresponding reference numerals. As with alignment block assembly 110, alignment block preform 130 has first and second assembly portions 12, 14. First assembly portion 12 has mating surface 16 in which a plurality of grooves 18 are formed. Likewise, second assembly portion 14 has a mating surface 20 in which a plurality of grooves 18 are formed. The first assembly portion also includes first and second receiving cavities 24, 26, respectively, for alignment purposes as previously described. Alignment block preform 130 also includes a plurality of electrical lead portions 112, 114 projecting from both first and second assembly portions 12, 14. Alignment block preform 130 is provided to make a plurality of optoelectronic device receptacles and accordingly, alignment block preform 130 can be as long or as short as desired. The longer alignment block preform 130 is, the more optoelectronic device receptacles can be made. The fabrication process for making a plurality of optoelectronic device receptacles using alignment block preform 130 is very similar to that illustrated in FIG. 2. After bonding the preform halves over the fiber array, the assembly would be sawn apart along cut lines 132, and the ends of the fiber stubs would be optically finished to produce the separate alignment blocks. It is also possible to abut adjacent, but separate, alignment blocks to produce a continuous run of alignment block assemblies.

Figure 12:
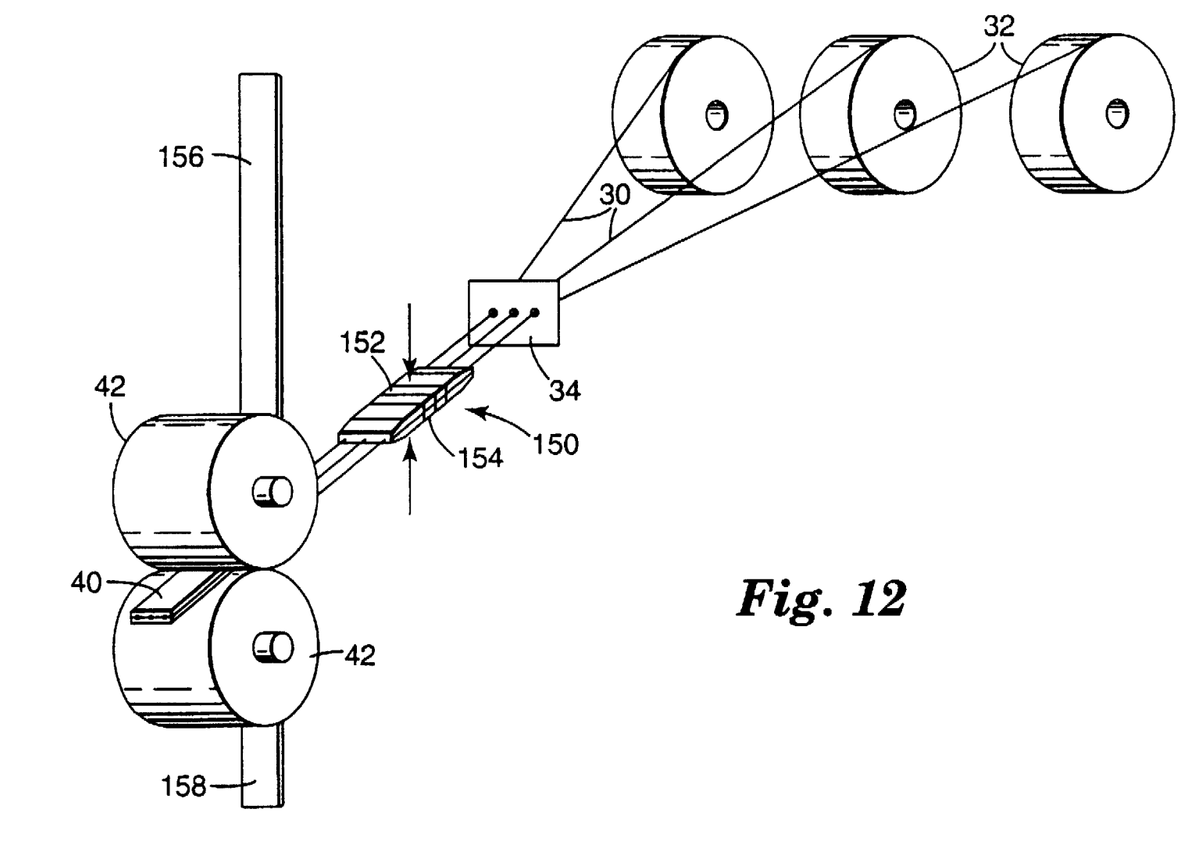
FIG. 12 illustrates a method of fabricating receptacle alignment blocks, connector alignment blocks and fiber cable in one continuous process.
Figure 13:
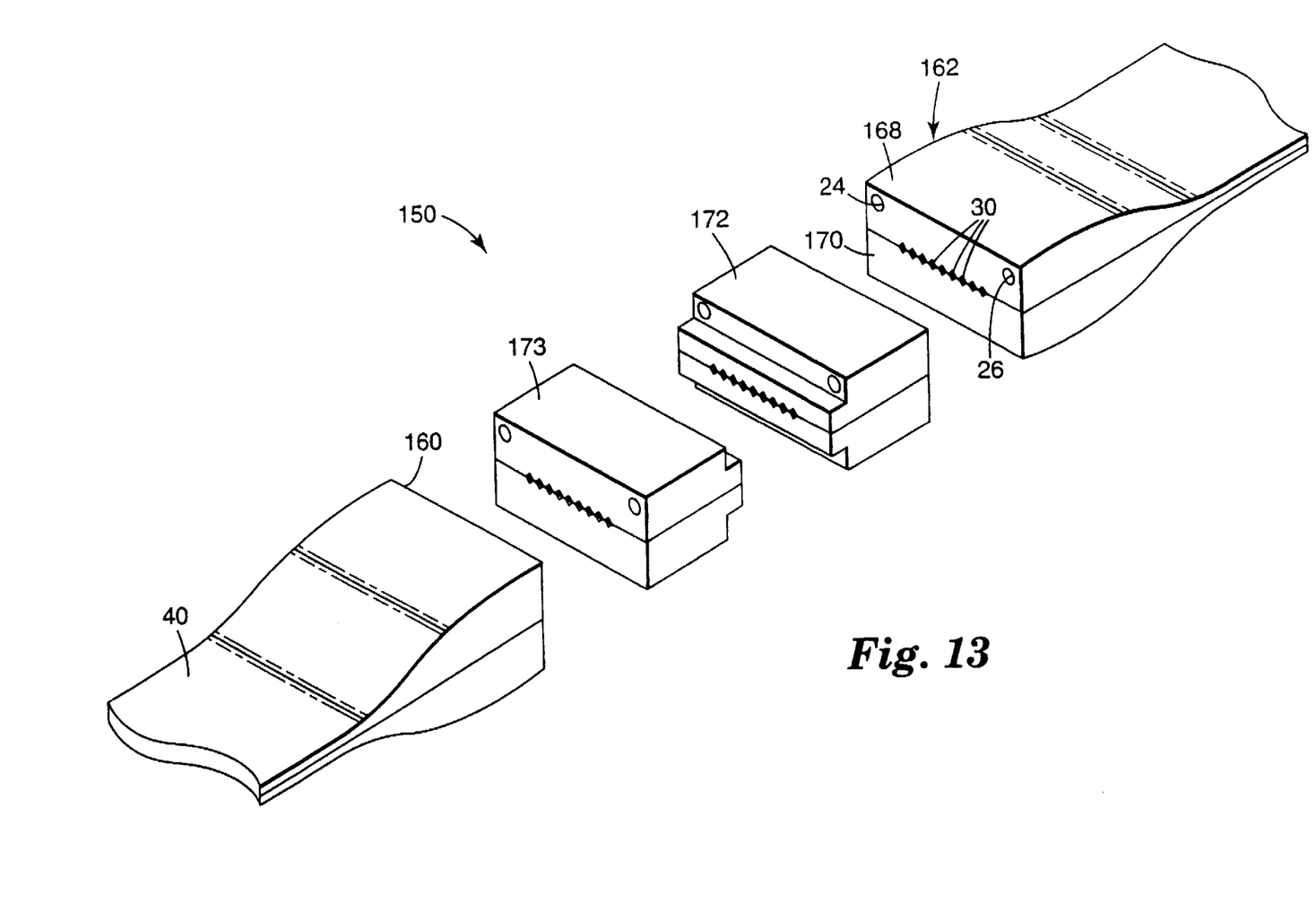
FIG. 13 illustrates the assembly produced by the process shown in FIG. 12 after cutting.

In another alternate embodiment of the present invention, shown in FIG. 12, it is possible to fabricate the receptacle alignment block, the connector alignment block, and the fiber optic ribbon cable in one continuous process. The assembly so formed is then cut apart as shown in FIG. 13 to form receptacle alignment blocks and connector alignment blocks, with the connector alignment blocks already mounted on the ends of the optical fiber cable.

The process illustrated in FIG. 12 is very similar to that described in FIG. 3 and thus, like elements will be correspondingly identified. One or more optical fibers 30 are drawn from a corresponding series of spools 32 holding such optical fibers. A guiding comb 34 is provided with structure to establish a fixed, lateral interfiber spacing between optical fibers 30. Preferably, the spacing corresponds with a fixed lateral interfiber spacing of grooves 18. After optical fibers 30 are brought through guiding comb 34, a super-alignment block 150 having first and second super-alignment block assembly portions 152, 154 are positioned above and below optical fibers 30. An adhesive is then used to secure the portions together. The adhesive used in the present invention is a commonly used adhesive for optical connectors, but other mechanisms for joining first and second assembly portion 152, 154 may be used, such as a mechanical latching mechanism or welding, including ultrasonic welding. First and second assembly portions 152, 154 are then brought together so as to sandwich optical fibers 30 therebetween, thereby fixing the lateral interfiber dimension within alignment block assembly 150.

At a point further downstream in the process, an upper adhesive tape 156 and a lower adhesive tape 158 are introduced to sandwich optical fibers 30 therebetween creating a fiber optic ribbon cable 40. A pair of compression rollers 42 are preferably used to supply the force necessary to secure the tape layers together and to compress portions 152 and 154 together.

By assembling optical fibers 30 and super-alignment block assembly 150 in line with ribbon cable 40, significant time and money are saved with installation of optical connectors on the optical fibers. Additionally, the manufacture of the integrated in-line super-alignment block assembly 150 can be incorporated into a continuous manufacturing process, thereby significantly reducing the production costs. Super-alignment block assemblies 150 may be inserted at discrete locations along the longitudinal length of optical fibers 30. By controlling the positioning and number of super-alignment block assemblies 150 it is possible to produce a continuous run of ribbon cable 40 having a series of cable segments, each with a length effectively determined by the positioning of sequential super-alignment block assemblies 150.

FIG. 13 illustrates a completed ribbon cable 40 having been fabricated with super-alignment block assembly 150 in line and having been cut three times. By cutting the assembly in three places, a pair of connector alignment blocks 160, 162 are formed, along with first and second optoelectronic device receptacle alignment blocks 172, 173, respectively.

Connector alignment block 160 which is not clearly illustrated in FIG. 15, substantially mirrors connector alignment block 162. Connector alignment block 162 comprises a first connector alignment block portion 168 and a second connector alignment block portion 170. First and second connector alignment block portions 168, 170 are parts of first and second assembly portions 152 and 150. Individual fibers 30 are retained between connector alignment block portions 168, 170. First and second receiving cavities 24, 26, respectively, may also be provided.

By using optical fibers 30 in optoelectronic device receptacles 164, 166, as opposed to epoxy or other light transmitting substances, the lightguides in the receptacles automatically have the same light transmitting characteristics (e.g., refractive indexes) as the fibers in the cable connectors, which makes for excellent optical coupling. While it is not necessary to only connect receptacle 173 to connector alignment block 160 and receptacle 172 to connector alignment block 162, doing so ensures optimal alignment because the components have been fabricated from the same super-alignment block assembly 150. It should be noted, that, as stated above, any connector alignment block made according to the present invention can be connected to any optoelectronic device receptacle made according to the present invention.

We claim:

1. An optoelectronic device interface system comprising:
   a) a receptacle body comprising a central cavity and a latch receiving structure;
   b) a first receptacle alignment block mounted in the central cavity of the receptacle body, wherein the alignment block comprises:
      an optical fiber mating surface having at least one groove therein for engaging an optical fiber, and at least one optical fiber disposed in the at least one groove, wherein the at least one optical fiber extends over the entire length of the alignment block,
      a cable mating surface at a first end of the optical fiber mating surface and generally normal thereto, wherein the cable mating surface comprises at least one receiving cavity; and
      an electronic device mating surface at a second end of the optical fiber mating surface and generally normal thereto; and
   c) an optical fiber cable assembly comprising:
      an optical fiber cable comprising a plurality of optical fibers mounted in a generally parallel arrangement, and
      a connector attached to at least one end of the optical fiber cable, wherein the connector comprises:
         an alignment block comprising an alignment device to engage the receiving cavity in the cable mating surface of the fiber receptacle alignment block, and
         a latching structure to engage the latch receiving structure in the receptacle body.

2. The receptacle of claim 1, further comprising securing means for securing the at least one optical fiber in the at least one groove.

3. The receptacle of claim 1, further comprising a second receptacle alignment block portion that mates with the first receptacle alignment block portion thereby securing the at least one optical fiber in the at least one groove therebetween.

4. The interface system of claim 3, further comprising a flexible circuit mounted to the mated first and second receptacle alignment block portions wherein an optoelectronic semiconductor component is mounted to the first receptacle alignment block portion via the flexible circuit.

5. The interface system of claim 3, further comprising a flexible circuit mounted to the mated first and second receptacle alignment block portions wherein an optoelectronic semiconductor component is mounted to the second receptacle alignment block portion via the flexible circuit.

6. The interface system of claim 3, further comprising a flexible circuit mounted to the mated first and second receptacle alignment block portions wherein an optoelectronic semiconductor component is mounted to both the first and second receptacle alignment block portions via the flexible circuit.

7. The interface system of claim 4, wherein the flexible electrical circuit comprises a polymer film having a plurality of electrical lines contained thereon, and wherein the flexible circuit has a plurality of electrically conductive pads thereon for electrically connected to the optoelectronic semiconductor component.

8. The interface system of claim 3, further comprising securing means for securing the first and second block portions.

9. The interface system of claim 8, wherein the securing means is an adhesive.

10. The interface system of claim 4, wherein the optoelectronic semiconductor component has an active area from which light is emitted and wherein the optoelectronic semiconductor component is mounted to the flexible circuit such that the active area is aligned with the optical fibers.

11. The interface system of claim 4, further comprising a protective coating encompassing the optoelectronic semiconductor component.

12. The interface system of claim 3, further comprising alignment means for aligning the alignment block portion with a connector.

13. The interface system of claim 3, wherein the first and second receptacle alignment block portions have optical semiconductor component coupling surfaces, the subassembly further comprising:

a first electrical lead integrally formed in the first receptacle alignment block portion and extending to a point outside of the first receptacle alignment block portion; and a second electrical lead integrally formed in the second receptacle alignment block portion and extending to a point outside the second receptacle alignment block portion at least one electrical contact on the optical semiconductor component coupling surfaces of both the first and second receptacle alignment block portions, the at least one contact of the first receptacle alignment block portion being electrically connected to the first electrical lead, and the at least one contact of the second receptacle alignment block portion being electrically connected to the second electrical lead.

14. The interface system of claim 13, further comprising:

a plurality of electrical leads integrally formed in at least one of the first and second receptacle alignment block portions and extending to a point outside the first and second alignment block portions; and a plurality of electrical contacts on the optical semiconductor component coupling surfaces connected to the plurality of electrical leads.

15. The interface system of claim 14, further comprising at least one electrical contact on the optical semiconductor component coupling surfaces of both the first and second receptacle alignment block portions, the at least one contact of the first receptacle alignment block portion being electrically connected to the first electrical lead, and the at least one contact of the second receptacle alignment block portion being electrically connected to the second electrical lead.

16. The interface system of claim 1, wherein the optoelectronic device receptacle further comprises an optoelectronic semiconductor component selected from the group consisting of one or more of:

laser arrays, edge-emitting lasers, super luminescence diodes, vertical cavity surface emitting lasers, light emitting diodes or optical detectors.

17. An optoelectronic device interface system comprising:

a) a receptacle body comprising a central cavity and an arrangement of receiving slots;

b) a first and a second receptacle alignment block mounted in the central cavity of the receptacle body, wherein each of the first and second alignment blocks comprises:

an optical fiber mating surface having at least one groove therein for engaging an optical fiber, a cable mating surface at a first end of the optical fiber mating surface and generally normal thereto, wherein the cable mating surface comprises at least one receiving cavity; and an electronic device mating surface at a second end of the optical fiber mating surface and generally normal thereto;

wherein the optical fiber mating surface of the first receptacle alignment block mates with the optical fiber mating surface of the second receptacle alignment block, and wherein at least one optical fiber is disposed between the first and second receptacle alignment blocks and in the at least one groove, and extends over the entire length of the alignment block;

c) securing means for securing the first and second receptacle alignment blocks together;

d) an optical fiber cable assembly comprising:

an optical fiber cable comprising a plurality of optical fibers mounted in a generally parallel arrangement, and a connector attached to at least one end of the optical fiber cable, wherein the connector comprises:

an alignment block comprising an alignment device to engage the receiving cavity in the cable mating surface of the fiber receptacle alignment block, and a latching structure comprising first and second latching arms to engage the receiving slots in the receptacle body; and e) a flexible electrical circuit mounted to the electronic device mating surfaces of the first and second receptacle alignment blocks.

18. The interface system of claim 17, wherein the securing means is an adhesive.

19. The interface system of claim 17, wherein the flexible electrical circuit comprises a polymer film having a plurality of electrical lines contained thereon, and wherein the flexible circuit has a plurality of electrically conductive pads thereon for electrically connecting to a desired optoelectronic semiconductor component.

20. The interface system claim 17, further comprising an optoelectronic semiconductor component mounted to the flexible electrical circuit.

21. The interface system of claim 20, wherein the optoelectronic semiconductor component has an active area and wherein the optoelectronic semiconductor component is mounted to the flexible circuit such that the active area is aligned with the optical fibers.

22. The interface system of claim 20, wherein the optoelectronic semiconductor component is selected from the group consisting of one or more of:

laser arrays, edge-emitting lasers, super luminescence diodes, vertical cavity surface emitting lasers, light emitting diodes, or optical detectors.

23. A method of making an optoelectronic device interface system comprising the steps of:

providing a first block preform portion having an exposed surface, a mating surface and a pair of coupling surfaces, wherein the mating surface has at least one groove formed therein;

positioning at least one fiber adjacent the at least one groove formed in the first block preform portion;

placing a second block preform portion adjacent the at least one fiber such that the fiber is between the first and second block preform portions, wherein the second portion has an exposed surface, a mating surface and a pair of coupling surfaces;

securing the first and second block preform portions together such that the mating surfaces abut such that at the least one fiber is located in the at least one groove of the first portion;

encapsulating the individual fibers and the first and second block preform portions with a pair of adhesive tape layers; and cutting the block preform in at least two places forming a pair of connector alignment blocks and at least one optoelectronic device receptacle block.

24. The method of claim 23, further including the step of providing alignment means for the pair of connector alignment blocks and the at least one optoelectronic device receptacle.

25. The method of claim 24, including the additional step of polishing the ends of the cut fibers as necessary.

26. The method of claim 24, including the additional step of mounting an optoelectronic semiconductor device to the at least one optoelectronic device receptacle block.

* * * * *